No. 714,181. Patented Nov. 25, 1902.
J. D. HILLIARD, Jr.
TRIPPING ELECTRIC SWITCHES OR CIRCUIT BREAKERS.
(Application filed Nov. 13, 1901.)
(No Model.) 2 Sheets—Sheet I.

Witnesses:

Inventor:
John D. Hilliard, Jr.
by
Atty.

No. 714,181. Patented Nov. 25, 1902.
J. D. HILLIARD, Jr.
TRIPPING ELECTRIC SWITCHES OR CIRCUIT BREAKERS.
(Application filed Nov. 13, 1901.)
(No Model.) 2 Sheets—Sheet 2.

Witnesses:

Inventor:
John D. Hilliard, Jr.
by Albert G. Davis
Atty.

UNITED STATES PATENT OFFICE.

JOHN D. HILLIARD, JR., OF SCHENECTADY, NEW YORK, ASSIGNOR TO GENERAL ELECTRIC COMPANY, A CORPORATION OF NEW YORK.

TRIPPING ELECTRIC SWITCHES OR CIRCUIT-BREAKERS.

SPECIFICATION forming part of Letters Patent No. 714,181, dated November 25, 1902.

Application filed November 13, 1901. Serial No. 82,094. (No model.)

*To all whom it may concern:*

Be it known that I, JOHN D. HILLIARD, Jr., a citizen of the United States, residing at Schenectady, county of Schenectady, State of New York, have invented certain new and useful Improvements in Tripping Electric Switches or Circuit - Breakers, (Case No. 2,501,) of which the following is a specification.

In operating switches or circuit-breakers for alternating currents, particularly those that are thrown by a relay or similar device, it is common to employ an independent source of energy, usually a direct current furnished by an auxiliary generator, such as a low-voltage dynamo or battery. There is a possibility with such a system that at a critical moment the source of tripping energy may fail, which would lead to disastrous consequences.

It is the object of my invention to provide energy for the tripping-circuit from the supply or distribution circuit, in which the switches are installed. In certain classes of work it has been proposed to utilize the distribution-circuit as the source of tripping-current, broadly considered, by employing a relay to close a potential branch across the circuit. Such an arrangement, however, is open to the very serious objection that if the lines should be short-circuited there would be no potential on the tripping-coil and the apparatus would fail to do its work.

The distinguishing feature of my invention consists in the employment of a circuit derived from a coil in series relation to the supply or distribution circuit which will be in operative condition so long as energy is flowing in the circuit and which in the event of a short circuit will carry a heavier load than normal. I prefer to employ a circuit derived either from a series transformer or directly from the line, normally short-circuited by contacts which may be opened when a supply of energy is required—as, for example, the short-circuiting contacts may be controlled by an overload-coil responsive to the distribution-circuit or to a reverse-current relay, so that when a contingency arises to open the contacts the tripping - current is shunted through the coil controlling the circuit-breaker.

The novel features of my invention will be more particularly described hereinafter and will be definitely indicated in the appended claims.

In the accompanying drawings, which illustrate my invention as applied to various types of circuits, Figures 1 and 4 show types of tripping systems for triphase alternating currents; Figs. 2 and 5, for quarter-phase currents, and Figs. 3 and 6 for single-phase currents.

In Fig. 1, 1 and 2 represent transformers the primaries of which are connected in series relation to distribution-wires or bus-bars representing different phases of a triphase circuit. In series relation to each transformer-secondary may be placed a magnet-coil 3 4, controlling a contact 5 6, in shunt relation to which may be placed trip-coils governing the controlled circuit-breakers. In the particular type of system shown in Fig. 1 the two transformer-secondaries are cross-connected by a common wire 7, the trip-coils 8 9 10 being placed in parallel relation to a common circuit connected in shunt relation to the contact devices 5 6. Normally the secondary circuit of the transformers 1 2 is closed through the contacts 5 and 6, respectively; but if either transformer is loaded to a limit determined by the calibration of the magnet controlling the contact device 5 or 6 the short circuit is opened and current forced to traverse the companion transformer-secondary and the trip-circuit, thereby actuating all the circuit-breakers and opening the mains.

In Fig. 2 the invention is shown as applied to a quarter-phase system, each transformer in this type being provided with an independent trip-circuit, thereby avoiding the inductance of the companion transformer. In the arrangement shown in Fig. 1 of course this inductance would be considered in fixing the tripping value of the coils 8, 9, and 10. It will be apparent from what has already been said that the series transformers 1 2 in Fig. 2, derived from the two phases of the circuit, respectively, discharge their load-current on the secondary through the contact devices 5 6; but when either of these devices operates under overload both trip-coils are energized, thereby opening both phases of the circuit.

In Fig. 3 the same type of system is shown as applied to a single-phase circuit.

In Fig. 4 independent tripping-circuits for each transformer are provided, each tripping-circuit controlling its own trip-coil $8^a\ 8^b\ 9^a\ 9^b$.

Figure 1:
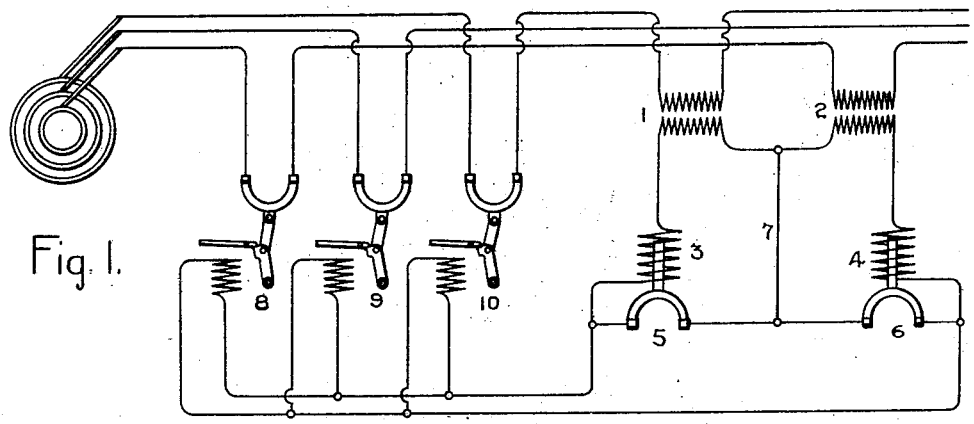
Figure 2:
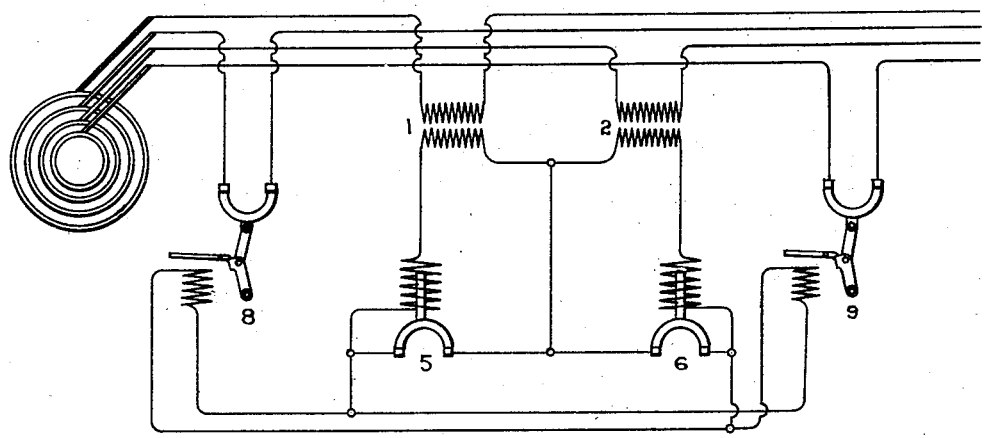
Figure 3:
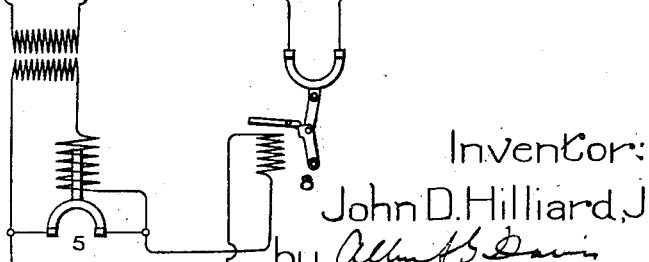
Figure 4:
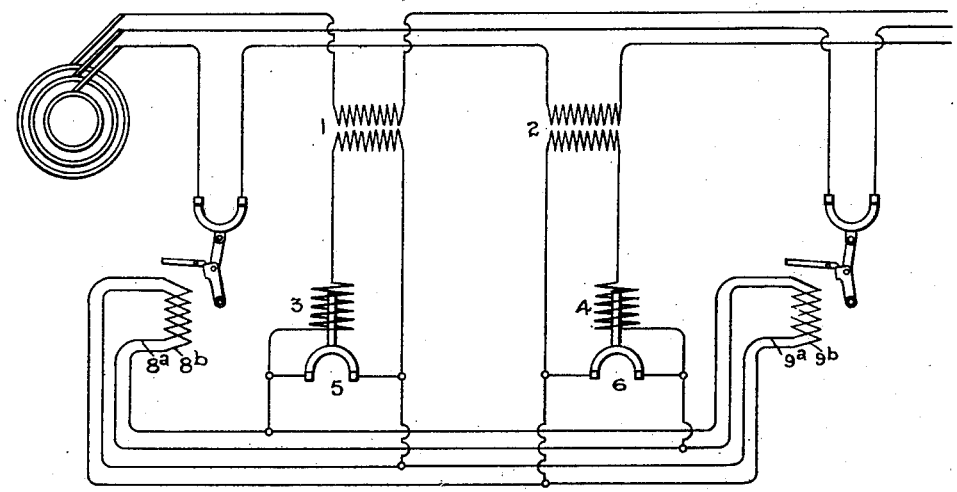
Figure 5:
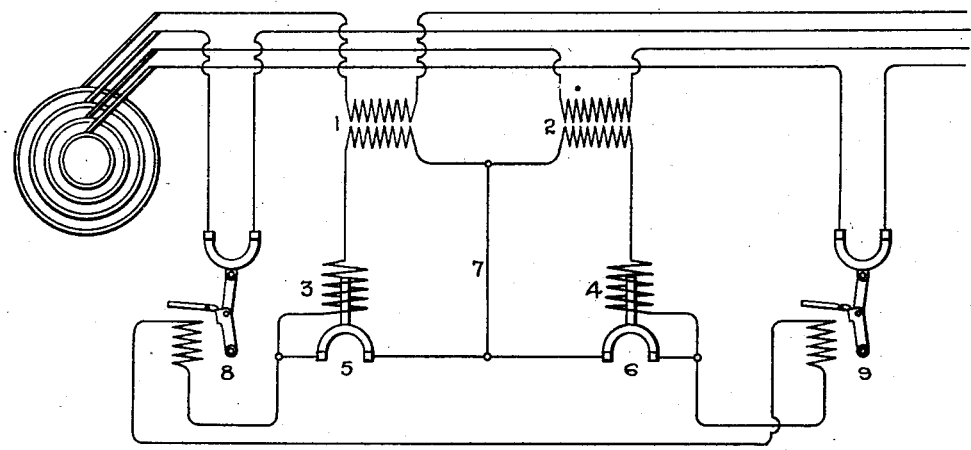
Fig. 5 shows the application to a quarter-phase circuit of the type of system explained in connection with Fig. 1.
Figure 6:
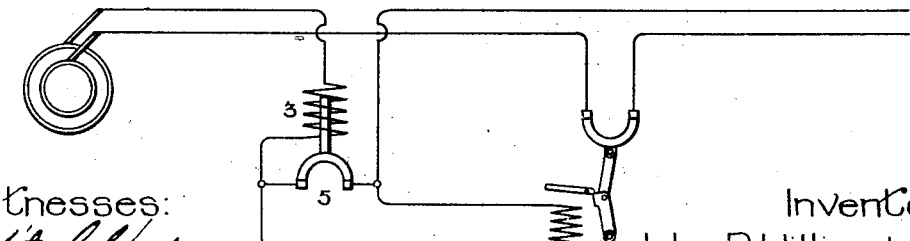
Fig. 6 shows a tripping-circuit excited directly from the alternating mains without the intervention of a transformer.

In all cases it will be seen that an auxiliary source of tripping energy is dispensed with and a circuit provided for this purpose which is normally inactive, but supplied with actuating energy the instant occasion requires it, and which must inevitably be furnished if the system itself is alive. Thus failure of the apparatus to respond through an accident on some secondary system independently supplied is rendered absolutely impossible. Besides this feature of reliability my system dispenses with the necessity of an auxiliary supply of energy, to provide which involves an item of considerable expense in the installation of electric supply stations or substations.

What I claim as new, and desire to secure by Letters Patent of the United States, is—

1. The combination, with an alternating-current circuit, of a local circuit supplied thereby, a contact device normally short-circuiting a magnet-coil in said local circuit, and means for opening the short circuit upon determinate line conditions in the alternating circuit.

2. The combination, with an alternating-current circuit, of a switch or circuit-breaker included therein, a tripping-coil for said circuit-breaker included in a circuit supplied by the system, a short-circuiting device for said tripping-circuit, and a coil governed by determinate line conditions for opening said short circuit.

3. The combination, with an alternating-current circuit, of a switch included therein, a trip-coil for said switch connected in a circuit derived from the main circuit, a normally completed short circuit for said trip-coil, and an electromagnetic device responsive to overload conditions in the main circuit for opening said short circuit.

4. The combination of an alternating-current source, a series transformer supplied thereby, a switch in the main circuit, a trip-coil therefor operatively related to the secondary of the transformer, means for short-circuiting said trip-coil, and an overload-magnet responsive to line-current for opening said short circuit.

5. The combination, with an automatic circuit-breaker, of a trip-coil therefor, a short circuit for the trip-coil, and a magnet responsive to the circuit containing the switch of the circuit-breaker for opening the short circuit.

6. The combination, with an alternating-current circuit, of an automatic circuit-breaker therefor, a trip-circuit for said breaker supplied in series relation, a short circuit across the trip-circuit, and a magnetic device responsive to line conditions to open the short circuit.

7. The combination, with an alternating-current circuit, of an automatic circuit-breaker, a trip-circuit therefor, a series transformer having its secondary supplying the trip-circuit, a short circuit across the trip-circuit, and a magnet responsive to line changes for opening the short circuit.

8. The combination, with a polyphase alternating-current circuit, of circuit-breakers for the several phases, trip-coils for the several breakers in a common trip-circuit, a short circuit for the several coils, and means responsive to line conditions on different phases to open the short circuit.

9. The combination, with a polyphase circuit, of circuit-breakers for the several phases, trip-coils therefor connected in parallel in a common trip-circuit, series transformers having their secondaries in the common trip-circuit, a short circuit for the trip-coils, and an overload-magnet for opening the short circuit.

In witness whereof I have hereunto set my hand this 11th day of November, 1901.

JOHN D. HILLIARD, JR.

Witnesses:
BENJAMIN B. HULL,
HELEN ORFORD.